United States Patent [19]

Nagashima

[11] Patent Number: 5,291,107
[45] Date of Patent: Mar. 1, 1994

[54] CIRCUIT FOR DRIVING REEL MOTOR OF VIDEOTAPE RECORDER

[75] Inventor: Masao Nagashima, Kanagawa, Japan

[73] Assignee: Sony Corporation, Tokyo, Japan

[21] Appl. No.: 887,556

[22] Filed: May 18, 1992

Related U.S. Application Data

[63] Continuation of Ser. No. 645,818, Jan. 25, 1991, abandoned.

Foreign Application Priority Data

Jan. 31, 1990 [JP] Japan .................................. 2-20918

[51] Int. Cl.$^5$ .................................................. A02P 7/00
[52] U.S. Cl. ................................. 318/432; 388/821; 388/930
[58] Field of Search ................ 318/432, 139, 433; 388/815, 821.3, 902, 910, 930, 800

[56] References Cited

U.S. PATENT DOCUMENTS

| 4,218,730 | 8/1980 | Marumoto et al. | 318/722 X |
| 4,525,658 | 6/1985 | Yanagida | 318/317 |
| 4,933,614 | 6/1990 | Kamata | 318/432 |

Primary Examiner—William M. Shoop, Jr.
Assistant Examiner—David Martin
Attorney, Agent, or Firm—Lewis H. Eslinger; Jay H. Maioli

[57] ABSTRACT

A load driving circuit causes a driving current to flow through a load, such as a reel motor, an audio load or the like through the collector and emitter of a drive transistor. A load voltage which changes according to changes in the driving current is obtained at a point of connection between the drive transistor and the load. On the basis of the load voltage, an offset voltage having a predetermined constant value is generated in a power supplying circuit so as to cancel a change in the load voltage. The offset voltage is supplied as driving source output to the drive transistor so as to prevent the generation of excess heat in the drive transistor even if the driving current changes.

2 Claims, 7 Drawing Sheets

5,291,107

CIRCUIT FOR DRIVING REEL MOTOR OF VIDEOTAPE RECORDER

This is a continuation of application Ser. No. 07/645,818, filed Jan. 25, 1991, now abandoned.

BACKGROUND OF THE INVENTION

The present invention relates to a load driving circuit, and particularly to a load driving circuit suitable for the constant-current driving of a load.

For example, video tape recorders each comprise such a load driving circuit for the constant current driving of a load, which circuit serves as a reel motor driving circuit for driving a take-up reel.

In such a reel motor driving circuit, the driving current of a reel motor comprising a dc motor is controlled by employing the characteristic that the driving current is proportional to a torque, which can be generated by the dc motor, so that the tension of a magnetic tape is controlled to a constant value regardless of the rotational speed of the reel.

It is generally necessary to select a relatively large value as the output current value of the load driving circuit applied to such a reel motor driving circuit so as to cause the driving circuit to generate a torque sufficient for practical use. It is also necessary to use a power source with a sufficiently high voltage for practical use because the rotational speed of the reel motor varies within a wide range.

The torque of the reel motor comprising a dc motor is proportional to the value of the driving current thereof, and the rotational speed of the reel motor is proportional to the voltage under a constant load torque. The reel motor must rotate the reel at a relatively low speed during a recording/reproducing mode, while it must rotate the reel at speed when the magnetic tape is moved at a high rewind or fast-forward speeds.

It is therefore thought that the power loss of the load driving circuit which forms the output stage of the reel motor driving circuit is inevitably increased.

SUMMARY OF THE INVENTION

The present invention has been achieved in consideration of the above-described problem, and it is an object of the present invention to provide a load driving circuit which permits a significant decrease in power loss.

In order to achieve the object, the present invention provides a load driving circuit comprising a drive transistor which is connected to a load in series for the purpose of supplying power output $I_{DC}$, $V_{CC}$ to the load through the drive transistor, wherein the power output having the driving voltage $V_{c(Q1)}$ consisting of a load voltage $V_{TML}$ and a predetermined offset voltage $V_{OFST}$ is supplied to the drive transistor. In this circuit, since the current flowing through the load is $e_i/R_1$ (wherein $e_{il} = V_{DT}$), the current has no relation to the load driving voltage. The current value equals to $I_{DC}$ if the base current of the drive transistor is assumed to be negligible.

When the driving voltage $V_{c(Q1)}$ having the load voltage $V_{TML}$ and the offset voltage $V_{OFST}$ is supplied to the collector of the drive transistor, since only a voltage corresponding to the offset voltage $V_{OFST}$ is constantly applied between the collector and emitter terminals of the drive transistor even if the load voltage $V_{TML}$ varies, it is possible to prevent the generation of excess heat in the drive transistor when the load voltage decreases. This enables the realization of a load driving circuit with high efficiency.

DETAILED DESCRIPTION OF PREFERRED EMBODIMENTS

Embodiments of the present invention are described in detail below with reference to the drawings.

First Embodiment

Figure 1:
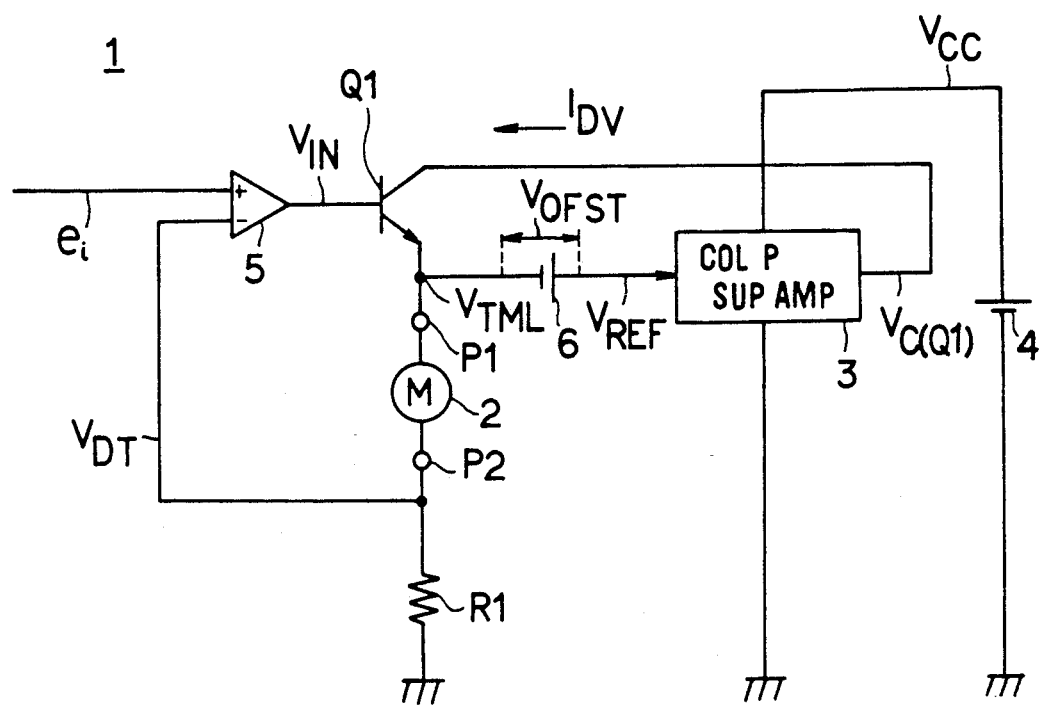
FIG. 1 is a block diagram of a load driving circuit in accordance with a first embodiment of the present invention.

In FIG. 1, reference numeral 1 denotes a load driving circuit in which the emitter of a drive transistor Q1, for example, comprising an NPN transistor, is connected to the non-earth side terminal P1 of a reel motor 2 which forms a load to be driven by the circuit 1, and a driving current detecting resistance R1 which is earthed at one end thereof is connected to the earth side terminal P2 of the reel motor 2.

An amplifier circuit 3 for supplying collector power is connected to the collector of the drive transistor Q1 so that the power output supplied from a dc power circuit 4 (voltage $V_{CC}$) is supplied to the non-earth side terminal P1 of the reel motor 2 through the collector and the emitter of the drive transistor Q1. As a result, a driving current $I_{DV}$ is caused to flow through the reel motor 2 and the driving current detecting resistance R1 and drives the reel motor 2.

In the state where the reel motor 2 is driven, the detection voltage $V_{DT}$ obtained at an intermediate point at the connection between the driving current detecting resistance R1 and the reel motor 2 is compared with the driving input signal $e_i$ in a comparator circuit 5. The deviation voltage obtained at the output terminal of the comparator circuit 5 is supplied as a driving control signal $V_{IN}$ to the base of the drive transistor Q1. This causes constant-current control of the drive transistor Q1 so that the driving current $I_{DV}$ corresponding to the driving input signal $e_i$ flows through the reel motor 2.

In addition to the above-described arrangement, an offset voltage circuit 6 is connected to an intermediate point at the connection between the emitter of the drive transistor Q1 and the reel motor 2. The offset voltage $V_{OFST}$ obtained between both ends of the offset voltage circuit 6 is supplied as a reference power supply voltage $V_{REF}$ to the amplifier circuit 3 for supplying collector power.

For example, if the gain of the collector power supplying circuit 3 is 1, the offset voltage $V_{OFST}$ of the offset voltage circuit 6 is set to a voltage value which is slightly larger than the saturation voltage $V_{CESAT}$ between the collector and the emitter of the drive transistor Q1 as shown by the following equation:

$$V_{OFST} > V_{CESAT} \quad (1)$$

The reference input voltage $V_{REF}$ obtained at the output terminal of the offset voltage circuit 6 is thus higher than the reel motor terminal voltage $V_{TML}$ by the offset voltage $V_{OFST}$ (the reel motor terminal voltage $V_{TML}$ being the voltage at an intermediate point at the connection between the drive transistor Q1 and the reel motor 2), as shown by the following equation:

$$V_{REF} = V_{TML} + V_{OFST} \quad (2)$$

This reference input voltage is supplied to the collector power supplying amplifier circuit 3.

The circuit constant of the collector power supplying amplifier circuit 3 is set so that the total gain $G_{AMP}$ including the gain of the offset voltage circuit 6 relative to the reference input voltage $V_{REF}$ is 1, as shown by the following equation:

$$G_{AMP} = 1 \quad (3)$$

As a result, the collector/emitter driving voltage $V_{C(Q1)}$ which is substantially equal to the offset voltage $V_{OFST}$, as shown by the following equation, is generated at the output terminal of the collector power supplying amplifier circuit 3:

$$V_{C(Q1)} = V_{OFST} \quad (4)$$

The collector/emitter driving voltage $V_{C(Q1)}$ is supplied to the collector of the drive transistor Q1.

In the above arrangement, in the operating mode of a video tape recorder, i.e., the recording mode and reproducing mode or the rapid feed mode, the drive transistor Q1 performs the constant-current operation in such a manner that the driving current $I_{DV}$ is a predetermined constant value in response to the driving input signal $e_i$ supplied to the comparator circuit 5. The reel motor 2 is thus driven with a take-up torque which causes the magnetic tape to have constant tape tension on the take-up reel.

In this driving state, the reference input voltage $V_{REF}$ having a voltage value which is higher than the reel motor terminal voltage $V_{TML}$ by the offset voltage $V_{OFST}$ is supplied to the input terminal of the collector power supplying amplifier circuit 3. The reference input voltage $V_{REF}$ is amplified with an amplification degree corresponding to the total gain $G_{AMP}$ of 1 and then supplied to the collector of the drive transistor Q1. The driving voltage which is higher than the reel motor terminal voltage $V_{TML}$, which is supplied to the emitter, by the offset voltage $V_{OFST}$ is therefore applied to the collector of the drive transistor Q1. As a result, the offset voltage $V_{OFST}$ is constantly applied between the collector and the emitter of the drive transistor Q1.

In a state where the reel motor 2 is driven with a constant current, the terminal voltage $V_{TML}$ of the reel motor 2 is a value which is determined by the rotational speed, the driving current and the rotational direction of the reel motor 2. The terminal voltage $V_{TML}$ therefore changes in accordance with the change of the driving mode of the reel motor 2 to the recording mode, the reproducing mode or the rapid feed mode. However, the collector/emitter driving voltage $V_{C(Q1)}$ applied to the collector and the emitter of the drive transistor Q1 ordinarily changes to the offset voltage $V_{OFST}$ in any one of the modes.

In the rapid feed mode, when the reel motor terminal voltage $V_{TML}$ is increased to a high value, the voltage of the collector of the drive transistor Q1 is accordingly changed so that the constant-current control of the reel motor 2 can be carried out in a stable manner by the drive transistor Q1. When the mode is changed to the recording mode or the reproducing mode, and when the terminal voltage $V_{TML}$ of the reel motor 2 is decreased with a decrease in the rotational speed of the reel motor 2, the collector voltage of the drive transistor Q1 is accordingly decreased so that no excess driving voltage is applied to the drive transistor Q1. It is therefore possible to prevent the over driving of the drive transistor Q1. There is thus no danger of generating excess heat in the drive transistor Q1. This enables the constant-current control of the reel motor 2.

The load driving circuit which is capable of constant-current driving the drive transistor Q1 with high efficiency can thus be realized.

Figure 2:
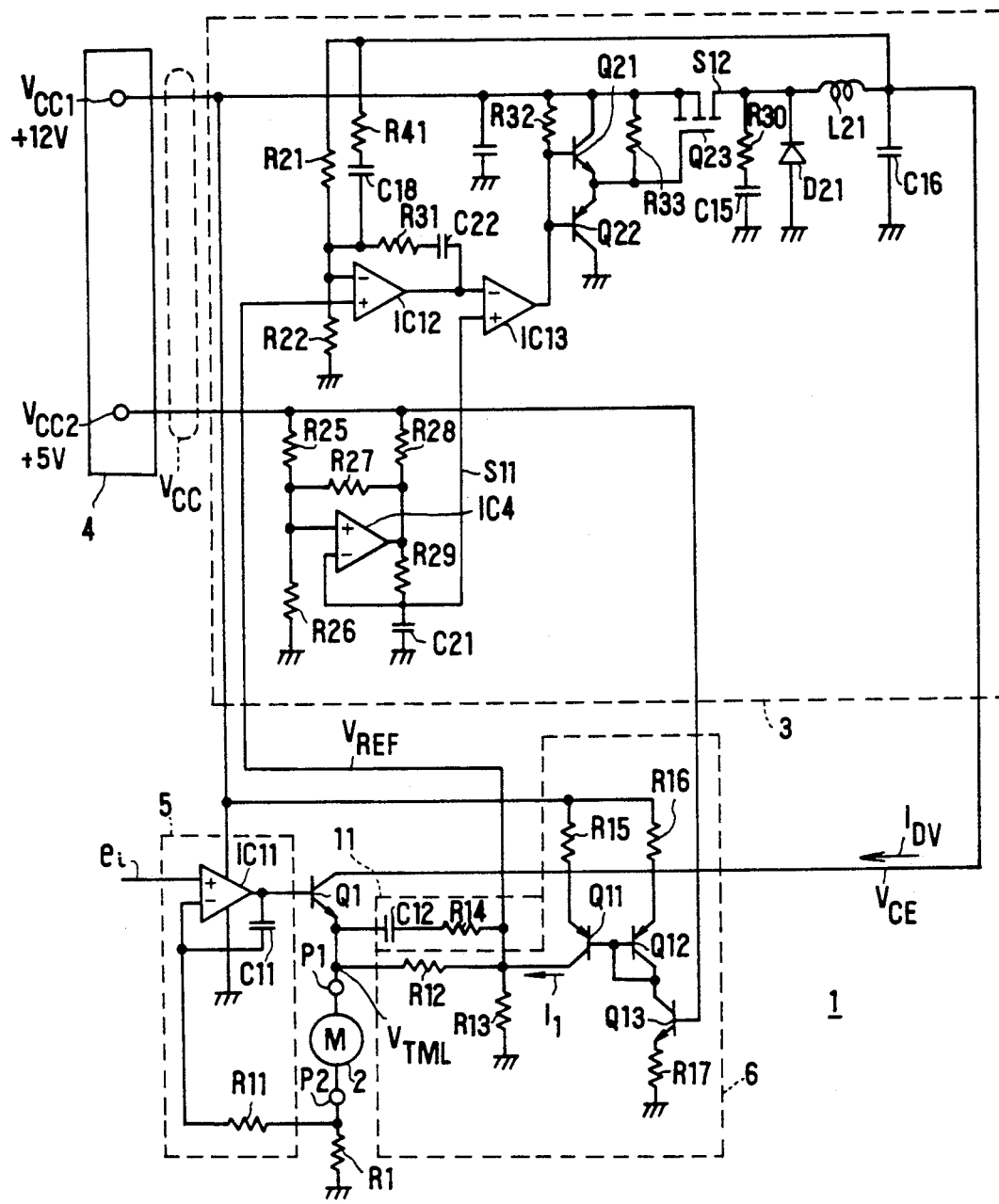
FIG. 2 is a connection diagram showing the detailed arrangement of the load driving circuit shown in FIG. 1.

Arrangement of Offset Voltage Circuit and Collector Power Supplying Amplifier Circuit A circuit having the arrangement shown in detail in FIG. 2 can be applied as the load driving circuit 1 shown in FIG. 1.

The comparator circuit 5 has a differential amplifier circuit IC11, a feedback input resistance R11 and an oscillation preventing capacitor C11 and forms a constant-current circuit with a conversion gain $e_i/R_1$ [A/V] together with the drive transistor Q1, the reel motor 2 and the driving current detecting resistance R1.

The offset voltage circuit 6 supplies to voltage division resistances R12 and R13 the constant-current output obtained from a constant-current circuit comprising a transistor Q13 having a base which receives the power output voltage $V_{CC2} (= +5 \text{ [V]})$ of the power circuit 4 and transistors Q11 and Q12 both of which form a current mirror circuit. The resistances R12 and R13 are connected to an intermediate point in connection between the drive transistor Q1 and the reel motor 2. The offset voltage $V_{OFST}$ which is mainly determined by the product of the constant current $I_1$ and the combined resistance of the voltage division resistances R12 and R13 (the effective resistance in a loop comprising the resistance R12, the reel motor 2, the driving current detecting resistance R1 and the earth is substantially the same as the resistance R12) is thus supplied as the reference power supply voltage $V_{REF}$ to the collector power supplying amplifier circuit 3 from the intermediate point to which the voltage division resistances R12 and R13 are connected.

In this embodiment, a lead compensating circuit 11 comprising a capacitor C12 and a resistance R14 is provided between the offset voltage circuit 6 and an intermediate point at the connection between the drive transistor Q1 and the reel motor 2. The lead compensating circuit 11 compensates for a delay from the reference power supply voltage $V_{REF}$ during processing of the driving power output supplied to the collector of the drive transistor Q1 from the collector power supplying amplifier circuit 3.

The reference power supply voltage $V_{REF}$ generated from the offset voltage circuit 6 is applied to the non-inversion input terminal of the differential amplifier circuit IC12 of the collector power supplying amplifier circuit 3. The difference between the reference power voltage $V_{REF}$ and the reference voltage obtained from gain setting resistances R21 and R22 in differential amplifier circuit IC12 is input to the subtraction input of a comparator circuit IC13 having.

The comparator circuit IC13 turns a switching transistor Q23 on through buffer transistors Q21 and Q22 when the output from the amplifier circuit IC12 is at a voltage level higher than that of the triangular wave voltage generated from the triangular wave generator having the differential amplifier circuit IC14. Conversely, the comparator circuit IC13 turns the switching transistor Q23 off when the voltage level of the output is lower than the triangular wave voltage. The pulse width-modulated output S12 which is obtained by modulating the pulse width of the power supply voltage $V_{CC1}$ to a value corresponding to the voltage level of the reference power supply voltage $V_{REF}$ is thus obtained at the output terminal of the switching transistor Q23.

The pulse width-modulated output S12 is smoothed by a smoothing circuit comprising a Schottky diode D21, a choke coil L21 and a capacitor C16. The dc output from the smoothing circuit is fed back to the resistance R21 and is also supplied as the dc driving current $I_{DV}$ of the dc voltage $V_{C(Q1)}$ to the collector of the drive transistor Q1.

In the above arrangement, the collector power supplying amplifier circuit 3 forms a pulse width modulating amplifier circuit having the switching transistor Q23 as a switching element, and the voltage gain $G_1$ of the amplifier circuit has a value which is determined by the following equation using a resistance ratio between voltage gain setting resistances R21 and R22:

$$G_1 = \frac{R21 + R22}{R22} \quad (5)$$

For example, if the resistances R21 and R22 are selected to have values of 220 [kΩ] and 33 [kΩ], respectively, the voltage gain $G_1$ of the pulse width modulating amplifier circuit is about the following value:

$$G_1 = \frac{220 \times 10^3 + 33 \times 10^3}{33 \times 10^3} \quad (6)$$
$$\approx 7.66 = 17.69 \,[dB]$$

While the offset voltage $V_{OFST}$ (substantially equal to the voltage between the both ends of the resistance R12) generated from the offset voltage circuit 6 is expressed by the product of the constant current $I_1$ and the combined resistance of the parallel resistances R12 and R13, as shown by the following equation:

$$V_{OFST} = I_1 \times (R12 \,//\, R13) \quad (7)$$

If the constant current output $I_1$ and the resistances R12, R13 and R1 are set to the values of 0.0447 [mA], 12 [kΩ], 1.8 [kΩ] and 1 [Ω], respectively, the offset voltage $V_{OFST}$ is therefore approximately 0.0700 [V].

$$V_{OFST} \approx 0.0700 \,[V] \quad (8)$$

Because the voltage $V_{TML}$ at the terminal P1 is divided by the resistances R12 and R13, the relation between $V_{TML}$ and $V_{REF}$ is as follows:

$$V_{REF} = \frac{R13}{R12 + R13} V_{TML} \quad (9)$$

The following equation is therefore obtained:

$$\frac{V_{REF}}{V_{TML}} = \frac{1 \times 10^3}{12 \times 10^3 + 1.8 \times 10^3} = 0.1304 = -17.69 \,dB \quad (10)$$

In this way, when the reference power supply voltage $V_{REF}$ is obtained by offsetting the reel motor terminal voltage $V_{TML}$ by the offset voltage $V_{OFST}$ in the offset voltage circuit 6, voltage attenuation occurs owing to the resistances R12 and R13. However, if the attenuation amount is set to a value which is substantially equal to the voltage gain $G_1$ in the pulse width modulating amplifier circuit of the collector power supplying amplifier circuit 3, i.e., the attenuation amount is set to 17.69 [dB], the total gain $G_{AMP}$ of the offset voltage circuit 6 and the collector power supplying amplifier circuit 3 can be made substantially 1 (=0 [dB]).

$$G_{AMP} = 1 \,(=0\,[dB]) \quad (11)$$

A voltage having the following value can also be applied between the collector and the emitter of the drive transistor Q1:

$$0.07 \times 7.66 = 0.536 \,[V] \quad (12)$$

As described above with reference to FIG. 1, therefore, the arrangement shown in FIG. 2 permits the collector driving voltage $V_{C(Q1)}$ of the drive transistor Q1 to float to a value obtained by offsetting by the offset voltage $V_{OFST}$ even if the value of the reel motor terminal voltage $V_{TML}$ changes according to changes of the Operating mode. It is therefore possible to apply the same driving voltage as the offset voltage $V_{OFST}$ between the collector and the emitter of the drive transistor Q1.

For example, in the recording mode or the reproducing mode in which the rotational speed of the reel motor 2 is decreased, and the terminal voltage of the reel motor 2 is decreased, since it is possible to prevent the supply of excess voltage to the collector of the drive transistor Q1, the danger of generating excess heat in the drive transistor Q1 can be effectively avoided. This enables the realization of the load driving circuit with high efficiency.

As in conventional cases, when the power supply voltage supplied to the collector of the drive transistor Q1 is set to a high value sufficient to permit the drive transistor Q1 to operate within a range with sufficiently good linearity for practical use, even if the terminal voltage of the reel motor 2 is increased (corresponding to a case where the reel motor 2 is rotated at a high speed in the rapid feed mode), if the terminal voltage of the reel motor 2 (corresponding to a case where the reel motor 2 is rotated at a low speed in the recording mode or the reproducing mode), an excess of voltage corresponding to the decrease in the terminal voltage of the reel motor 2 is supplied to the collector of the drive transistor Q1.

As a result, in a state where the reel motor 2 is driven with a constant current, the quantity of heat generated in the drive transistor Q1 is increased by an amount corresponding to the excess of driving voltage applied between the emitter and the collector, and the overall efficiency of the load driving circuit 1 thus deteriorates. However, the arrangement shown in FIGS. 1 and 2 is capable of preventing the occurrence of the deterioration in efficiency.

The degree of improvement of the efficiency is described below with reference to the embodiment shown in FIG. 2.

Figure 12:
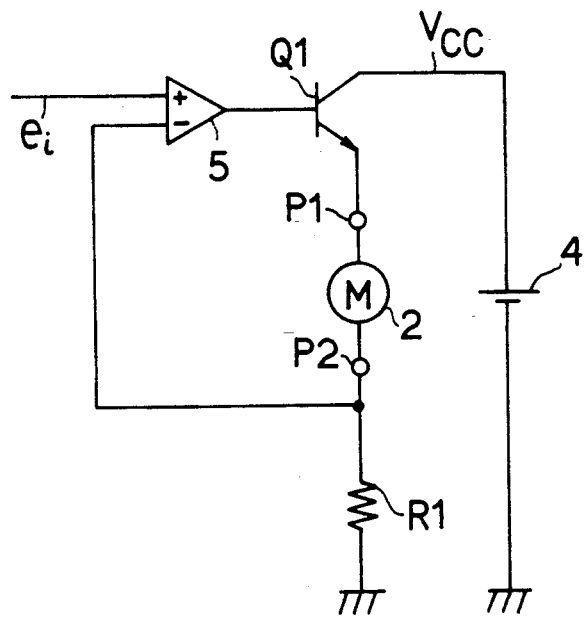
FIG. 12 is a connection diagram of a conventional load driving circuit.

For example, in the conventional arrangement shown in FIG. 12 in which the portions corresponding to those shown in FIG. 1 are denoted by the same reference numerals, in the operating mode in which the power supply voltage $V_{CC}$ supplied from the power circuit 4 is 12 [V] and the terminal voltage $V_{TML}$ of the reel motor 2 is 3 [V], if the constant driving current $I_{DR}$ flowing through the driving current detecting resistance R1 of 0.2 [Ω] is 0.5 [A], the heat loss $W_1$ generated in the drive transistor Q1 is as follows:

$$W_1 = (12\,[V] - 3\,[V] - 0.2\,[\Omega] \times 0.5\,[A]) \times 0.5\,[A] \quad (13)$$
$$= 4.45\,[W]$$

In the arrangement shown in FIG. 1, if the offset voltage $V_{OFST}$ is set to 0.8 [V], and the total gain $G_{AMP}$ of the offset voltage circuit 6 and the collector power supplying amplifier circuit 3 is set to 1, since the voltage $V_{CE}$ between the emitter and the collector of the drive transistor Q1 is equal to the offset voltage $V_{OFST}$, i.e., 0.8 [V], the heat loss W2 generated in the drive transistor Q1 is the following:

$$W_2 = 0.5\,[A] \times 0.8\,[V] \quad (14)$$
$$= 0.4\,[W]$$

In addition to this, since the collector voltage $V_C$ of the drive transistor Q1 is the sum of the fall voltage (=0.2 [Ω]×0.5 [A]) drop across the resistance R1, the terminal voltage (=3 [V]) of the reel motor 2 and the offset voltage (=0.8 [V]), as shown in the following equation:

$$V_C = 0.2\,[\Omega] \times 0.5\,[A] + 3\,[V] + 0.8\,[V] \quad (15)$$
$$= 3.9\,[V]$$

The output W3 generated in the collector power supplying amplifier circuit 3 should be the following:

$$W_3 = (12\,[V] - 3.9\,[V]) \times 0.5\,[A] \quad (16)$$
$$= 4.05\,[W]$$

If the efficiency of the collector power supplying amplifier circuit 3 is 90% (this level can be practically obtained by using an arrangement comprising a pulse width modulating circuit), the input power W4 supplied from the power circuit 4 is the following:

$$W_4 = \frac{4.05}{\frac{90}{100}} = 4.5\,[W] \quad (17)$$

The loss W5 generated in the collector power supplying amplifier circuit 3 is therefore the following:

$$W_5 = 4.5\,[W] - 4.05\,[W] \quad (18)$$
$$= 0.45\,[W]$$

As a result, the total loss $W_6$ generated in the drive transistor Q1 and the collector power supplying amplifier circuit 3 is the following:

$$W_6 = W_2 + W_5 \quad (19)$$
$$= 0.4\,[W] + 0.45\,[W]$$
$$= 0.85\,[W]$$

The total loss $W_6$ (Equation (19)) generated in the arrangement shown in FIG. 1 can be reduced to about 1/5 of the loss $W_1$ (Equation (13)) generated in the arrangement shown in FIG. 12. Particularly, in regard to the heat loss $W_2$ generated in the drive transistor Q1 (Equation (11)), the heat loss $W_2$ can be reduced to about 1/10 of the heat loss in the conventional arrangement shown in FIG. 12.

The use of the load driving circuit 1 shown in FIG. 1 thus enables a significant increase in the efficiency of the reel motor, as compared with the conventional case shown in FIG. 12.

Figure 3:
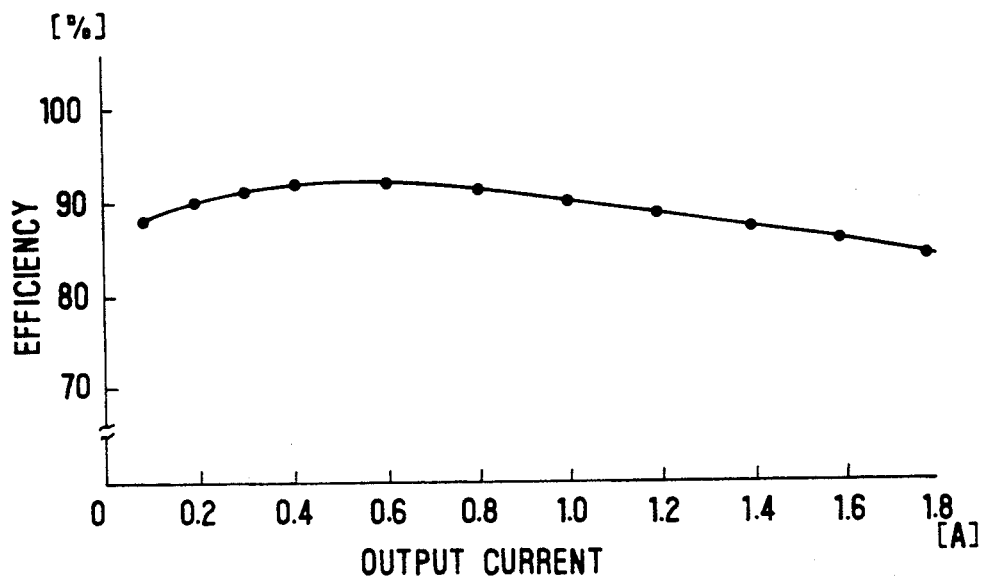
FIGS. 3 and 4 are drawings respectively showing the characteristic curves of the operation of the circuit shown in FIG. 2.
Figure 4:
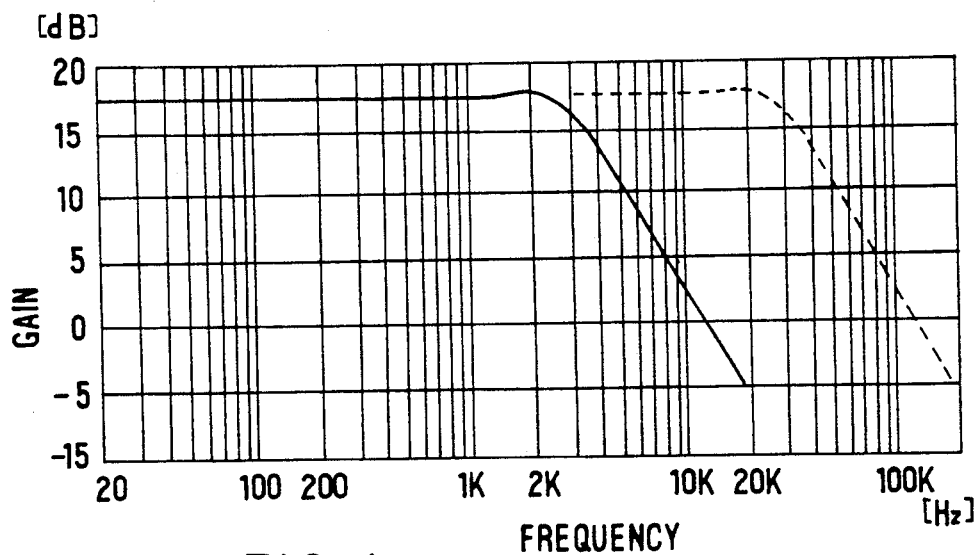

In addition to this, in the embodiment shown in FIG. 2, the collector power supplying amplifier circuit 3 has an efficiency of about 90% even if the output current changes, as shown in FIG. 3, and the frequency characteristics that the output gain is substantially constant within a frequency region up to about 2 [kHz], as shown in FIG. 4.

Figure 5:
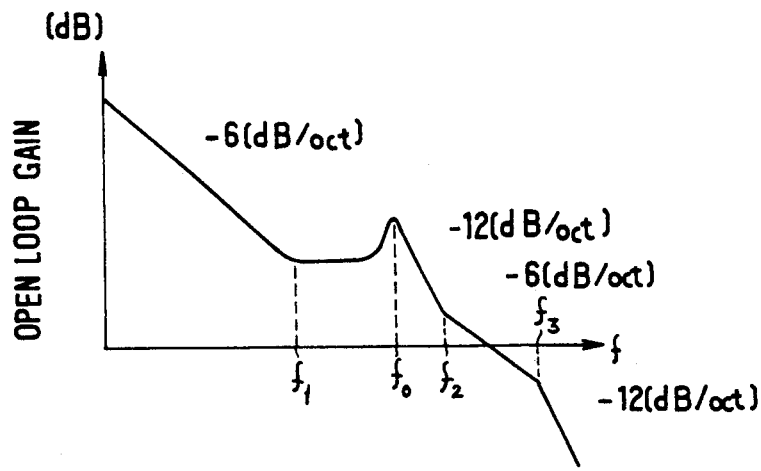
FIGS. 5 and 6 are drawings respectively showing the characteristic curves provided for explaining the phase compensating operation of the circuit shown in FIG. 2.
Figure 6:
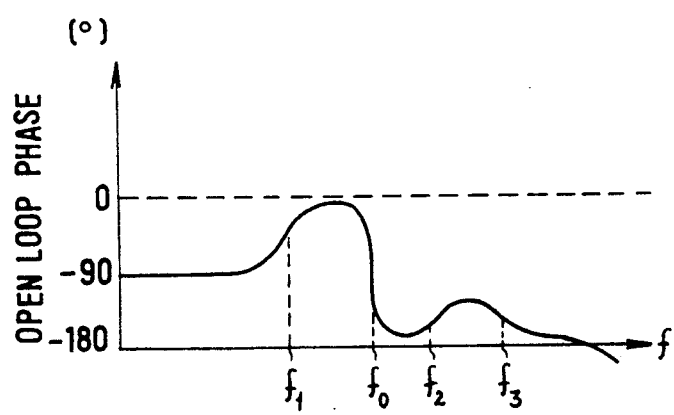

In addition, in the embodiment shown in FIG. 2, a voltage corresponding to the voltage gain $G_1$ of the collector power supplying amplifier circuit 3 is added to the attenuated voltage by supplying the terminal voltage $V_{TML}$, which is divided by the voltage division resistances R12 and R13, to the transistor Q11 comprising a constant-current circuit in the offset voltage circuit 6. Phase lead compensation is thus performed so as to realize the flat phase characteristics (shown in FIGS. 5 and 6) of the collector power supplying amplifier circuit 3 over a wide band.

In the collector power supplying amplifier circuit 3, since a filter circuit comprising the choke coil L21 and the capacitor C16 is provided in the stage after the switching transistor Q23, attenuation of −12 [dB/oct] occurs at the resonance frequency $f_0$ (refer to FIG. 5), and the phase is rotated −180°. The attenuation and phase rotation can be removed by phase-lead compensation using the voltage division resistances R12 and R13 of the offset voltage circuit 6.

Further, in the embodiment shown in FIG. 2, the lead compensating circuit 11 which is connected in parallel with the voltage division resistance R12 and which comprises the C12 and R14 performs phase lead compensation of the signal input to the collector power supplying amplifier circuit 3 so as to prevent the occurrence of a clip phenomenon in the drive transistor Q1.

When the operating band of the collector power supplying amplifier circuit 3 is unsatisfactory, if the input signal has a high frequency component, a sufficient output voltage cannot be obtained as the collector driving voltage $V_{C(Q1)}$ because a phase lag occurs.

If the voltage between the emitter and the collector of the drive transistor Q1 cannot be maintained at a predetermined value, $h_{FE}$ of the drive transistor Q1 is decreased, resulting in the occurrence of a clip phenomenon. While, in the embodiment shown in FIG. 2, the provision of the lead compensating circuit 11 enables compensation of the phase lag generated in the collector power supplying amplifier circuit 3, thereby preventing the occurrence of the clip phenomenon in the drive transistor Q1.

Second Embodiment

Figure 7:
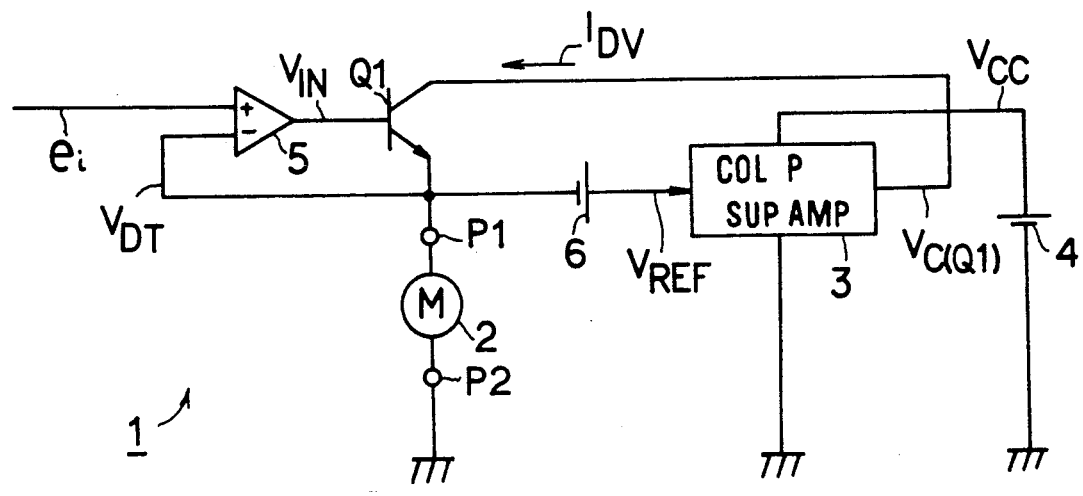
FIGS. 7 to 11 are respectively block diagrams of a second embodiment to a sixth embodiment.

FIG. 7 shows a second embodiment of the present invention. In FIG. 7, the sections corresponding to those shown in FIG. 1 are denoted by the same reference numerals. In the second embodiment, the driving current detecting resistance R1 shown in FIG. 1 is not provided, and the reel motor terminal voltage $V_{TML}$ obtained at an intermediate point of the connection between the drive transistor Q1 and the reel motor 2 is used as the detection voltage $V_{DT}$ which is applied to the inversion input terminal of the comparator circuit 5.

In the arrangement shown in FIG. 7, the comparator circuit 5 performs constant-voltage control of the drive transistor Q1 in such a manner that the reel motor terminal voltage $V_{TML}$ has a constant value.

In this embodiment, the driving voltage corresponding to the offset voltage $V_{OFST}$ of the offset voltage circuit 6 can also be supplied to the emitter and collector of the drive transistor Q1 in the same way as that described above with reference to FIG. 1. It is therefore possible to constantly supply an appropriate collector voltage to the collector of the drive transistor Q1 and drive the drive transistor with high efficiency, thereby preventing the generation of excess heat in the drive transistor.

Third Embodiment

Figure 8:
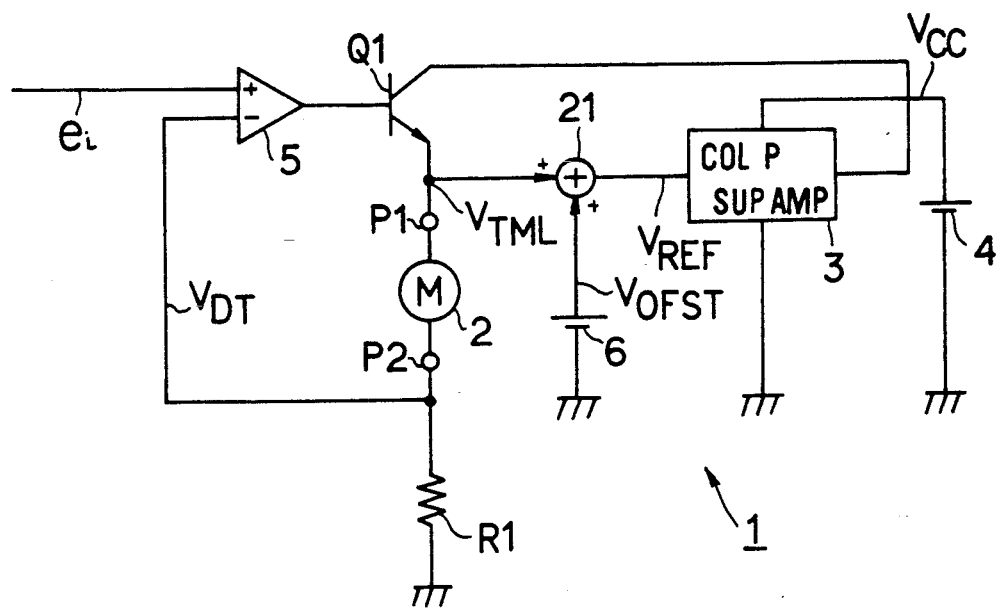

FIG. 8 shows a third embodiment in which the load driving circuit 8 drives the reel motor 2 only in the forward direction.

The drive transistor Q1 comprises a NPN transistor and supplies the motor terminal voltage $V_{TML}$ obtained at an intermediate point in connection between the drive transistor Q1 and the reel motor 2 to an adder 21. The drive transistor Q1 also supplies as a second addition input to the adder 21 the offset voltage $V_{OFST}$ obtained at the non-earth side terminal of the offset voltage circuit 6 earthed at one terminal thereof. The addition output from the adder 21 is input as the reference voltage $V_{REF}$ to the collector power supplying amplifier circuit 3.

In the arrangement shown in FIG. 8, the adder 21 can supply the reference power supply voltage $V_{REF}$, which is higher than the motor terminal voltage $V_{TML}$ by the offset voltage $V_{OFST}$, to the collector of the drive transistor Q1 through the collector power supplying amplifier circuit 3. When the reel motor 2 is driven in the forward direction, therefore, the offset voltage $V_{OFST}$ can be supplied between the collector and the emitter of the drive transistor Q1.

The arrangement shown in FIG. 8 permits the constant-current driving of the drive transistor Q1, without generating excess heat.

Fourth Embodiment

Figure 9:
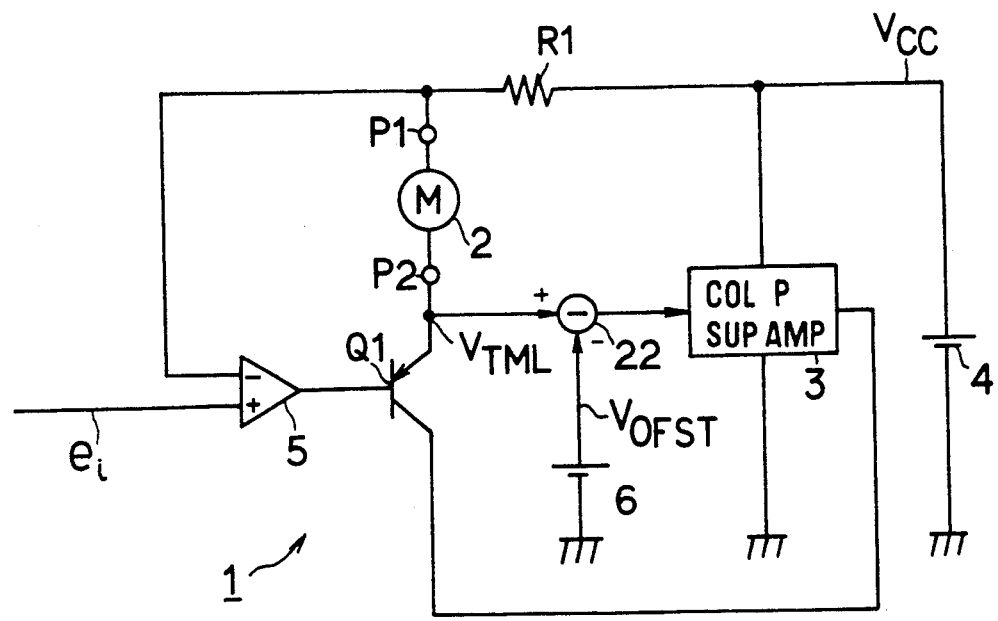

In the fourth embodiment shown in FIG. 9, the load driving circuit 1 drives the reel motor 2 only in the reverse direction.

The drive transistor Q1 comprises a PNP transistor and supplies the power output $V_{CC}$ from the power circuit 4 to the reel motor 2 through the driving current detecting resistance R1 so as to cause the driving current to flow through the reel motor 2 in the reverse direction.

The motor terminal voltage $V_{TML}$ obtained at an intermediate point in connection between the reel motor 2 and the emitter of the drive transistor Q1 is supplied to the addition input terminal of a subtracter 22. The offset voltage $V_{OFST}$ of the offset voltage circuit 6 is supplied to the subtraction input terminal of the subtracter 22.

As a result, the reference power supply voltage $V_{REF}$ which is lower than the motor terminal voltage $V_{TML}$ by the offset voltage $V_{OFST}$ is obtained at the output terminal of the subtracter 22. The reference power supply voltage is supplied to the collector of the drive transistor Q1 through the collector power supplying amplifier circuit 3.

It is therefore possible to apply to the collector of the drive transistor Q1 the collector voltage which is lower than the motor terminal voltage supplied to the emitter by the offset voltage $V_{OFST}$ and thus constant-current drive the drive transistor Q1 in the reverse direction without generating excess heat therein.

Fifth Embodiment

Figure 10:
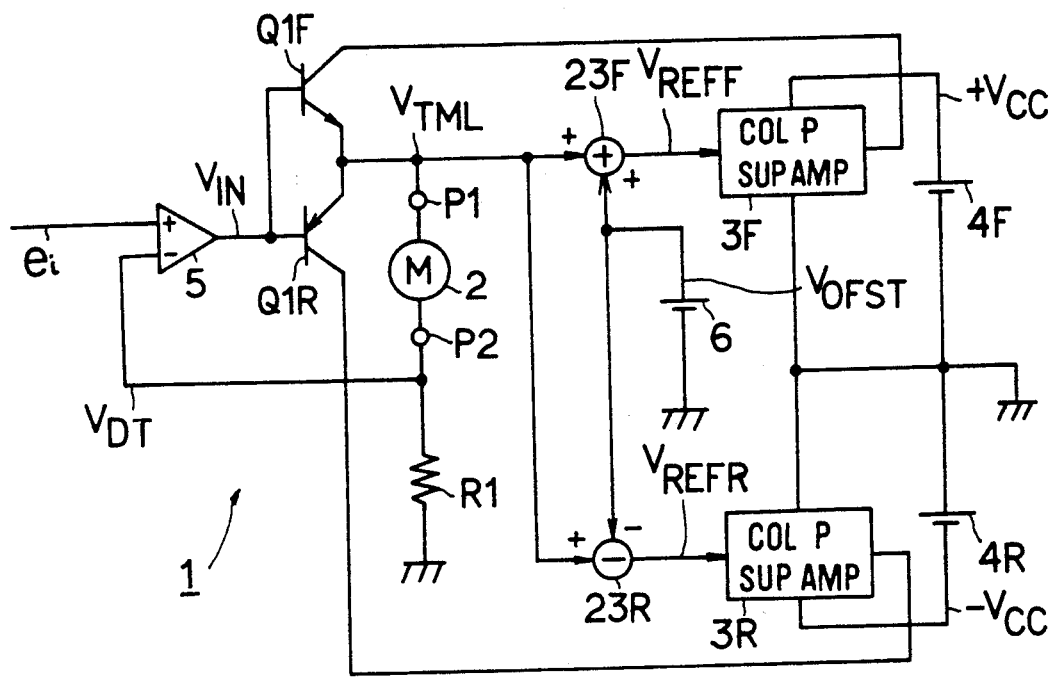

FIG. 10 shows a fifth embodiment in which the sections corresponding to those shown in FIG. 1 are denoted by the same reference numerals. In the embodiment, the reel motor 2 is driven in the forward or reverse direction under constant-current control while generating substantially the same amount of torque.

In this embodiment, the driving control signal $V_{IN}$ obtained at the output terminal of the comparator circuit 5 is supplied to the bases of a forward drive transistor Q1F comprising a NPN transistor and a reverse drive transistor Q1R comprising a PNP transistor. The emitter connected to both the transistors is earthed through the reel motor 2 and the driving current detecting resistance R1.

The motor terminal voltage $V_{TML}$ of the reel motor 2 is added to the offset voltage $V_{OFST}$ of the offset voltage circuit 6 in an adder 23F and then supplied as a forward reference voltage $V_{REFF}$ to the collector of the forward drive transistor Q1F through a forward collector power supplying amplifier circuit 3F.

In the same way, the motor terminal voltage $V_{TML}$ is supplied to a subtracter 23R in which the offset voltage $V_{OFST}$ of the offset voltage circuit 6 is subtracted from the terminal voltage $V_{TML}$. The reverse reference voltage $V_{REFR}$ obtained at the output terminal of the subtracter 23R is supplied to the collector of the reverse drive transistor Q1R through a reverse collector power supplying amplifier circuit 3R.

In the above arrangement, when power supply voltages $+V_{CC}$ and $-V_{CC}$ are supplied as power to the forward collector power supplying amplifier circuit 3F and the reverse collector power supplying amplifier circuit 3R, respectively, the forward collector power supplying amplifier circuit 3F (or the reverse collector power supplying amplifier circuit 3R) is controlled to assume the operating state by driving the reel motor 2 in the forward direction (or the reverse direction). This causes the constant-current driving of the forward drive transistor Q1F (or the reverse drive transistor Q1R). As a result, the reel motor can be driven in the forward direction (or the reverse direction) by switching the direction of the current flowing through the reel driving motor 2 to the forward direction (or the reverse direction).

During the constant-current driving of the forward drive transistor Q1F (or the reverse drive transistor Q1R), since a driving voltage corresponding to the offset voltage $V_{OFST}$ can be supplied between the collector and emitter of the forward drive transistor Q1F (or the reverse drive transistor Q1R), the driving voltage can be caused to flow through the reel motor 2. As a result, a torque can be generated in the forward and reverse directions.

This embodiment which is provided with the collector power supplying amplifier circuits 3F and 3R for the forward and reverse directions, respectively, permits control of the forward and reverse drive transistors Q1F and Q1R so as to prevent the generation of excess heat therein.

Sixth Embodiment

Figure 11:
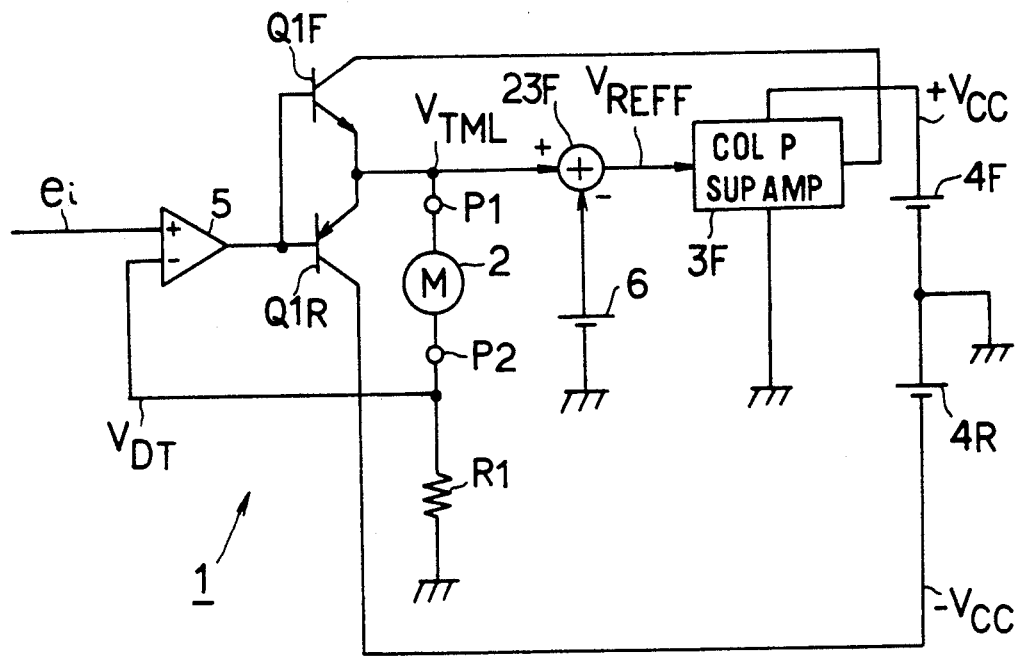

FIG. 11 shows a sixth embodiment in which the sections corresponding to those shown in FIG. 1 are denoted by the same reference numerals. In the embodiment, the arrangement of a circuit for driving the reel motor 2 is simplified.

In the arrangement shown in FIG. 11, the subtracter 23R and the reverse collector power supplying amplifier circuit 3R, both of which are shown in FIG. 10, are not provided, and the power output $V_{CC}$ of a reverse power source 4R is directly supplied to the collector of the reverse drive transistor Q1R.

In the arrangement shown in FIG. 11, when the forward driving mode is designated by a positive signal serving as the driving input signal $e_i$, a relatively large driving current is caused to flow through the reel motor 2 so that the reel motor 2 generates a great torque.

In this state, when the offset voltage $V_{OFST}$ is supplied between the collector and emitter of the forward drive transistor Q1F through the forward collector power supplying amplifier circuit 3F, because the voltage supplied between the emitter and collector is maintained at the offset voltage $V_{OFST}$ even if the motor terminal voltage $V_{TML}$ varies, the forward drive transistor Q1F performs the driving operation without generating excess heat.

While, when the polarity of the voltage of the driving input signal $e_i$ is changed to negative to bring the reverse drive transistor Q1R into an operating state, the reverse power output $-V_{CC}$ is directly supplied between the emitter and the collector of the reverse drive transistor Q1R.

If the motor terminal voltage $V_{TML}$ is decreased, therefore, the driving voltage supplied between the emitter and the collector of the reverse drive transistor Q1R is increased in proportion to the decrease in the terminal voltage $V_{TML}$. However, when the reverse driving Current flowing through the reel motor 2 is small, and thus the torque generated is small, there is no danger of bringing the reverse drive transistor Q1R into an operating state where excess heat is generated.

When the reverse drive transistor Q1R is driven, therefore, the subtracter 23R and the reverse collector power supplying amplifier circuit 3R, both of which are provided in the arrangement shown in FIG. 10, need not be used. This enables the significant simplification of the whole arrangement.

In addition, the reel motor in a general tape recording/reproducing apparatus is configured so that a large torque is required for taking-up the tape in the forward direction, and a small torque may be temporarily generated for the reverse direction (the feed direction of the tape). In this case, it is preferable to use the arrangement shown in FIG. 11.

Other embodiments (1) In each of the above-described embodiment, the load driving circuit of the present invention is applied for driving the reel motor of a tape recording/reproducing apparatus having a tape-shaped recording medium. However, the present invention is not limited to this, and the present invention can be widely applied to cases in which the power supply voltage supplied to a drive transistor is excessively increased when a load is changed, as in audio output stages.

(2) In the frequency characteristics shown in FIG. 4, the switching frequency of the switching transistor Q23 (FIG. 2) of the pulse width modulating circuit section is changed to a high value, the present invention enables the achievement of wide band characteristics so that a characteristic curve with a higher constant amplitude is extended to a frequency region by the increase in the switching frequency, as shown by a broken line in FIG. 4.

(3) The embodiment shown in FIG. 7 has the arrangement for constant-voltage driving corresponding to the constant-current driving circuit shown in FIG. 1. In a case of constant-voltage driving of a load corresponding to the arrangements shown in FIGS. 8 to 11, the driving current detecting resistance R1 is not provided so that the motor terminal voltage $V_{TML}$ is supplied as the detection voltage $V_{DT}$ to the comparator circuit 5 in the same way as in the arrangement shown in FIG. 7. In this case, a constant-voltage driving type of load driving circuit which exhibits the same effects as those described above with reference to FIG. 7 can be realized.

(4) Although each of the above embodiments concerns a case where the total gain $G_{AMP}$ of the offset voltage circuit 6 and the collector power supplying amplifier circuit 3 is 1 (Equation (9)), the total gain $G_{AMP}$ is not limited to this value and may be any value other than 1.

In addition, when the total gain $G_{AMP}$ is set to 1, if the current flowing through the drive transistors Q1, Q1F, Q1R is increased, the saturation voltage is increased, and there is thus a danger of making linear control impossible, the total gain $G_{AMP}$ may be set to a value larger than 1.

(5) In each of the above embodiments, a pulse width modulating circuit is used as the collector power supplying amplifier circuit 3. However, the collector power supplying amplifier circuit 3 is not limited to this, and any circuit which is capable of controlling the collector voltage in response to changes in the load current may be used.

As described above, the present invention is capable of maintaining the power supply voltage supplied between the emitter and collector of the drive transistor for driving a load at a predetermined offset voltage even if the terminal voltage is changed by changing the operating mode of the load. The present invention is thus capable of effectively preventing the generation of excess heat in the drive transistor. This enables the realization of a load driving circuit exhibiting significantly reduced power loss and high efficiency.

What is claimed is:

1. A load driving circuit comprising a drive transistor having a predetermined saturation voltage, said drive transistor being connected to a load in series for supplying output power to said load through said drive transistor, wherein said load comprises a reel motor of a video tape recorder and said circuit comprises:
    a collector power supplying circuit connected between a voltage source and a collector of said drive transistor for supplying to said drive transistor said output power; and
    an offset power supplying circuit connected to said voltage source and to said collector power supplying circuit and producing an offset voltage connected to an emitter of said drive transistor for adding a predetermined constant offset voltage greater than said saturation voltage to a voltage generated at a connection point between said load and said drive transistor.

2. A circuit for driving a reel motor used in a video signal recording and reproducing apparatus, said circuit comprising:
    a control circuit having a comparator circuit and a transistor both connected to said reel motor so that a torque of said reel motor is controlled in response to a control signal fed to a base of said transistor and a feedback signal fed to an input of said comparator circuit, said feedback signal being generated by detecting a current of said reel motor and said transistor having a predetermined saturation voltage;
    a circuit for generating a predetermined constant offset voltage greater than said saturation voltage;
    a power source generating circuit connected between a voltage source and a collector of said transistor for generating a supply voltage in response to an output voltage of said transistor and said offset voltage; and
    wherein said circuit for generating said offset voltage is connected to said voltage source and to said power source generating circuit for producing said offset voltage connected to an emitter of said transistor.

* * * * *